(12) United States Patent
Pinel et al.

(10) Patent No.: US 11,738,464 B2
(45) Date of Patent: Aug. 29, 2023

(54) ROBOTIC GEOMETRIC CAMERA CALIBRATION AND MONITORING ALERT CONFIGURATION AND TESTING

(71) Applicant: International Business Machines Corporation, Armonk, NY (US)

(72) Inventors: Florian Pinel, New York, NY (US); Russell Patrick Bobbitt, New York, NY (US); Frank Yeh, Jr., Santa Ana, CA (US); Sharon Laquinta Cham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 17/211,363

(22) Filed: Mar. 24, 2021

(65) Prior Publication Data
US 2022/0305661 A1    Sep. 29, 2022

(51) Int. Cl.
*B25J 9/16*    (2006.01)
*B25J 13/08*    (2006.01)

(52) U.S. Cl.
CPC ............ *B25J 9/1697* (2013.01); *B25J 9/163* (2013.01); *B25J 9/1674* (2013.01); *B25J 9/1692* (2013.01); *B25J 13/089* (2013.01)

(58) Field of Classification Search
CPC ........ B25J 9/1697; B25J 9/163; B25J 9/1674; B25J 9/1692; B25J 13/089
See application file for complete search history.

(56) References Cited

U.S. PATENT DOCUMENTS

| | | | | |
|---|---|---|---|---|
| 5,202,661 A | * | 4/1993 | Everett, Jr. | .......... G08B 29/188 340/565 |
| 7,330,777 B2 | * | 2/2008 | Hashimoto | ........... H04J 3/0667 700/262 |

(Continued)

FOREIGN PATENT DOCUMENTS

| | | |
|---|---|---|
| CN | 103279949 | 9/2013 |
| CN | 105307116 | 2/2016 |

(Continued)

OTHER PUBLICATIONS

Tsuyoshi Yokoya, Tsutomu Hasegawa and Ryo Kurazume, "Calibration of distributed vision network in unified coordinate system by mobile robots," 2008 IEEE International Conference on Robotics and Automation, 2008, pp. 1412-1417, doi: 10.1109/ROBOT.2008.4543400.*

(Continued)

*Primary Examiner* — Jeff A Burke
*Assistant Examiner* — Blake A Wood
(74) *Attorney, Agent, or Firm* — Robert D. Bean; Otterstedt & Kammer PLLC

(57) ABSTRACT

A method of calibrating a system including a camera, the method including detecting a robot navigating within an environment modeled as a geo-polygon space, including a transit of the robot through a scene of the environment captured by the camera, mapping a plurality of points occupied by the robot in images of the scene to the geo-polygon space, recording data about the mapping, and configuring at least one alert using the data recorded about the mapping, the alert executed by the computing system and configured to be triggered by an object transiting the scene.

14 Claims, 10 Drawing Sheets

(56) References Cited

U.S. PATENT DOCUMENTS

| | | | |
|---|---|---|---|
| 10,399,227 | B1 | 9/2019 | Islam et al. |
| 2008/0066207 | A1* | 3/2008 | Beniyama ............ B25J 9/0003 901/1 |
| 2019/0105781 | A1 | 4/2019 | Harada |
| 2019/0230348 | A1 | 7/2019 | Ciurea et al. |
| 2020/0018603 | A1 | 1/2020 | Deng et al. |
| 2020/0057435 | A1 | 2/2020 | Isakov |

FOREIGN PATENT DOCUMENTS

| | | |
|---|---|---|
| CN | 105785989 | 7/2016 |
| CN | 109141451 | 1/2019 |
| CN | 112504263 | 3/2021 |

OTHER PUBLICATIONS

English Translation of CN 105785989, Accessed Dec. 13, 2022.*
Anonymous, "Short Camera Calibration for Robotic Applications," IP.com, IPCOM000259881D; Sep. 26, 2019, pp. 1-3.
Yan Meng et al., "Self-Calibration of Camera-Equipped Robot Manipulators," The International Journal of Robotics Research, SAGE Publications, Nov. 2001, pp. 909-921, vol. 20, No. 11.
Bouwmans et al. Background Subtraction in Real Applications: Challenges, Current Models and Future Directions, Computer Science Review, Jan. 2019, pp. 1-58.
Anonymous, "Bounding boxes," https://www.ibm.com/support/knowledgecenter/en/SSGU8G_12.1.0/com.ibm.rtree.doc/ids_rti_009.htm, downloaded Mar. 17, 2021, pp. 1-2.
Authorized Officer Wu, Songjiang, PRC National IP Administration as ISA, related PCT application PCT/CN2022/078151, ISR and Written Opinion, 9 pages total, dated May 27, 2022.

* cited by examiner

ROBOTIC GEOMETRIC CAMERA CALIBRATION AND MONITORING ALERT CONFIGURATION AND TESTING

BACKGROUND

The present disclosure relates generally to a computer processes, and more particularly to a system and method for calibrating/configuring a computing system comprising one or more cameras using a robot.

Many spaces are equipped with camera systems. These cameras can have a variety of uses, including monitoring compliance with safety regulations. Many of these systems require extensive configuration.

SUMMARY

According to some embodiments of the present invention, a method of calibrating a system including a camera includes detecting a robot navigating within an environment modeled as a geo-polygon space, including a transit of the robot through a scene of the environment captured by the camera, mapping a plurality of points occupied by the robot in the images of the scene to the geo-polygon space, recording data about the mapping, and configuring at least one alert using the data recorded about the mapping, the alert executed by the computing system and configured to be triggered by an object transiting the scene.

According to one or more embodiments, a system comprises a computing system including a processor and a memory, a network connected to the computing system, a plurality of cameras connected to the computing system via the network, each camera with a field of view of an environment, at least one robot with in the environment, and at least one software module executing on the computing system, enabling the computing system to learn a model configured to identify the robot in the environment and the creation of at least one alert triggered by an object detection model executed by the computing system.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for:

automated configuration of a camera including, for example, geometric calibration, drawing regions of interest, and configuring monitoring alerts; and improved configuration of regions of interest.

These and other features and advantages of the present invention will become apparent from the following detailed description of illustrative embodiments thereof, which is to be read in connection with the accompanying drawings.

BRIEF DESCRIPTION OF THE DRAWINGS

Preferred embodiments of the present invention will be described below in more detail, with reference to the accompanying drawings.

DETAILED DESCRIPTION

Figure 1:
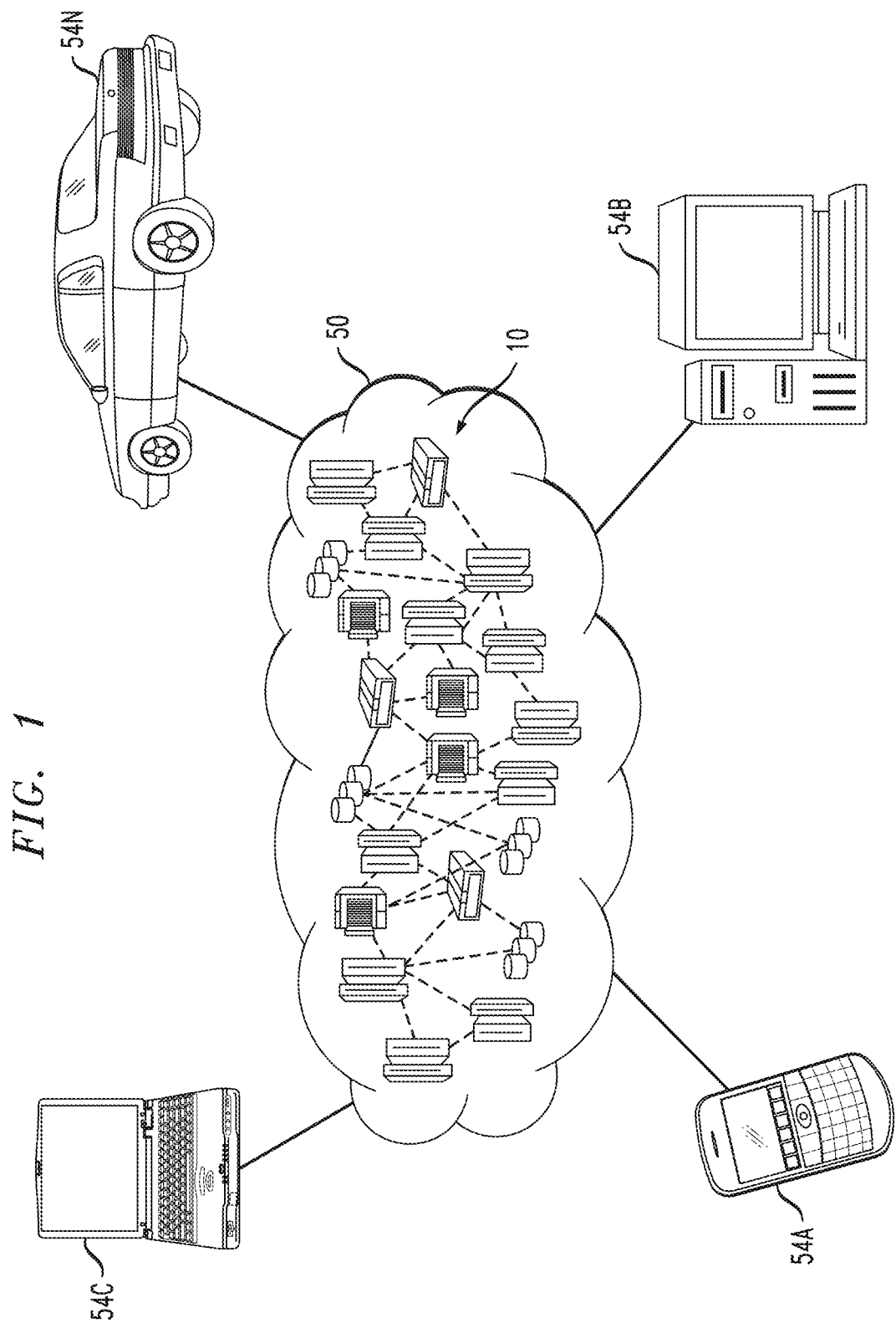
FIG. 1 depicts a cloud computing environment according to an embodiment of the present invention.

Embodiments of the present invention address automatic calibration and configuration of cameras using robots, video analytics, and IoT facilities management. According to some embodiments, a method performed by a computing system automatically tests video analytics pipelines using these cameras, and automatically collects annotated training data.

In some production environments, video analytics is integrated with other products such as that enable the management of numerous Internet-of-Things (IOT) devices, including cameras. According to one or more embodiments of the present invention, these products can be used together in a work safety solution to enforce one or more model workplace goals or regulations (e.g., maximum occupancy, personal protective equipment use, recording accidents, etc.).

According to some embodiments, automatic testing and collection of annotated training data can be used as an input to a video analytics solution, eliminating the need for simulated use cases to test that alerts are correctly and accurately triggered.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
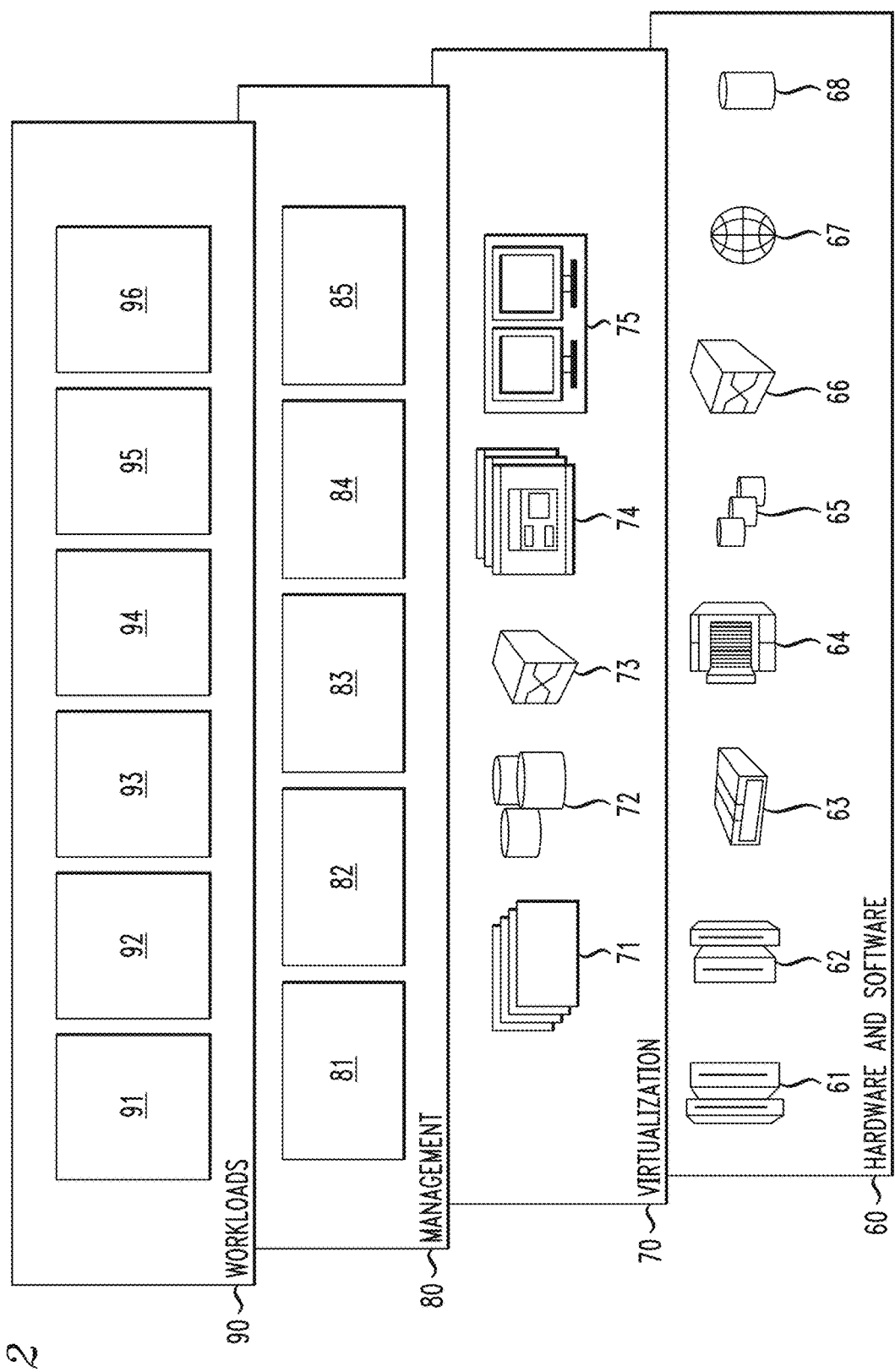
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and calibration/configuration of a computing system comprising one or more cameras using a robot 96.

Figure 3:
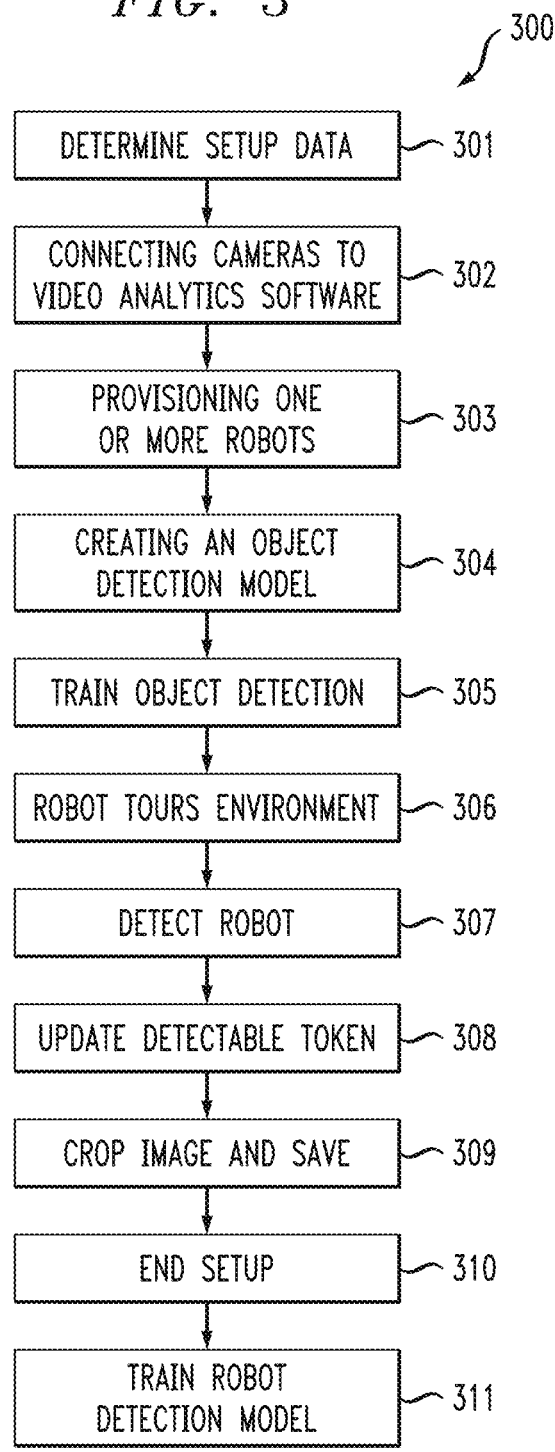
FIG. 3 is a flow diagram showing a method for establishing set up data according to some embodiments of the present invention.

According to some embodiments and referring to FIG. 3, a method 300 includes a computing system determining a floor plan, locations of cameras in the environment and camera specifications for a given environment 301. Furthermore, at block 301 the determination of one or more of the floor plan, the camera locations, and the camera specifications can be performed as receiving setup data from a facilities management software product. According to some embodiments, the facilities management software product communicates with one or more devices (e.g., IoT) devices, providing insights to the environment. The cameras are connected to a video analytics software 302. At block 302, the cameras can be connected to a video management system. According to some embodiments, an initial calibration of the cameras is performed at block 302 using a homography or other geometric method for determining a relationship between images captured by the cameras. In the example of a homography, the homography relates different images of a same planar surface in the environment. According to at least one embodiment, camera rotation and translation can be extracted from a homography matrix and used for guiding navigation of the robot. The homography matrix is computed between different images of the environment captured by the cameras from different angles, such that the matrix contains a warped form of the images. The method includes provisioning one or more robots capable of navigating using a floor plan 303. For example, a robot uses specific geographic coordinates determined in 301 to navigate the floor plan. To facilitate camera calibration, the robot can include configuration graphics, for example, a geometric shape of known (to the computing system) dimensions. These graphics are detectable tokens visible in the scene, and can be printed on the robot or displayed by the robot. In some embodiments, the robot is shaped like a parallelepiped (i.e., a three-dimensional figure formed by six parallelograms) that mimics the height and width of a person (e.g., about 168 cm high by 38 cm wide). According to at least one embodiment, the robot includes an internal adjustable framework (or other mechanism) for configuring the dimensions of the parallelepiped. In some embodiments, one or more of the sides of the robot includes one or more detectable tokens (e.g., calibration grids, different colors, etc.), which can be used to distinguish the sides of the robot, determine an orientation of the robot, etc. According to some embodiments, one or more robots has a human-like shape. According to some embodiments, the computing system creates an object detection model configured to detect the robot 304. The model can be used by the computing system to detect one or more detectable tokens or features of the robot (e.g., the corners of the parallelepiped). According to one or more embodiments, the object detection model is configured to perform detection of objects, landmarks, etc. at 304. The object detection model can be configured as a deep-learning model, improving detection functionality through repeated detection tasks.

According to some embodiments and in view of the foregoing, blocks 301-304 represent an initial setup process.

According to some embodiments, a robot detection setup is performed at blocks [305-].

According to at least one embodiment, an object detection model is trained to detect the robot and some of its key landmarks (e.g., the corners of the parallelepiped) 305. For example, the object detection model can be trained using deep learning objection detection or a representative based metric learning method.

In another embodiment, the robot makes one or more initial tours of the environment 306. As the robot tours the environment it passes within and/or through a field of view of the cameras (referred to hereinafter as a scene), the computing system uses the model to detect the robot 307.

According to some embodiments, the detection 307 uses a background subtraction technique to detect the robot in the scene. In a case where the robot is the only moving object in the scene (e.g., the robot is deployed in an environment such as retail store after hours), the robot can be trivially isolated from the background. Otherwise, in a case where the scene includes other moving objects in addition to the robot, the robot can be differentiated from the other moving objects using postprocessing techniques, such as looking for sharp peaks that correspond to a known emitted color from the robot in a detected object color histogram. According to some embodiments, the computing system can communicate a control signal to the robot, causing the robot to update a current detectable token (e.g., a known pattern, color, combination of features, etc.) 308. For example, the detectable token can be dynamically calibrated according to a current scene, such that the robot can change the detectable token in a case where the computing system determines that the detectable token is too similar to other moving objects in the scene. For example, in a case where the computing system detects more than one detectable tokens, but expects to detect only one, the computing system can signal the robot to update the detectable token. In another example, the computing system can compare can the detectable token to the foreground, and in a case that the detectable token is close (e.g., based on a threshold).

Figure 4:
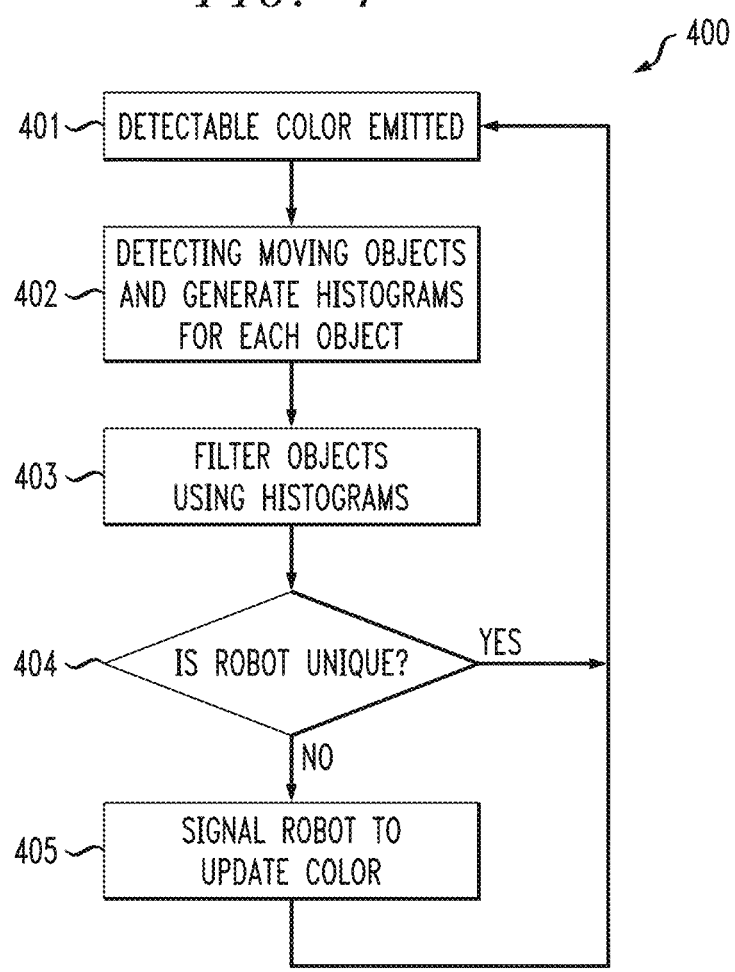
FIG. 4 is a flow diagram showing a method for dynamic control of a robot according to some embodiments of the present invention.

According to some embodiments and referring to the method 400 of FIG. 4, given a set of colors C, video analytics software is used by the computing system S to analyze images of the scene from the camera(s), a communication pipeline between the robot and S, x=1, the update of the detectable token 308 can include emitting color Cx by the robot 401, computing system S detects all moving objects in the scene and generates color histograms H for each object 402, the computing system S detects a number of moving objects P with sharp peaks of Cx in H 403, and at 404 the computing system determines if the robot is unique. For example, if P=1 (i.e., only the robot emits color Cx), keep the color, sleep N time; else if P>2, x=x+1 and send new color Cx to robot 405. The method 308 can be performed iteratively.

As the robot is detected in the scene during its tour 306-307, it is cropped from the current image and each cropped image is saved in a database 309. Once N sample images of the robot are saved, the setup tour ends 310. According to some embodiments, the sample images are then used to train a robot detection model 311. According to at least one embodiment, the training of the robot detection model uses traditional techniques, such as deep learning objection detection or a representative based metric learning method.

Figure 5:
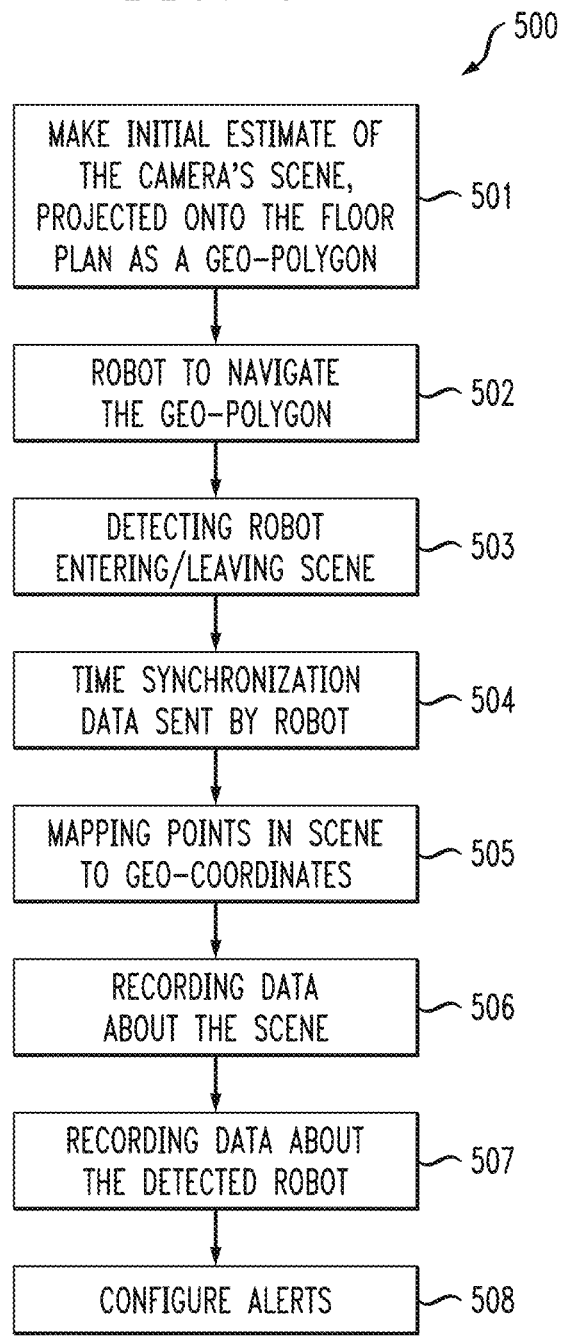
FIG. 5 is a flow diagram showing a method for configuring alerts of the computing system according to some embodiments of the present invention.

According to some embodiment and referring to FIG. 5, a camera calibration and configuration method 500 includes, for each camera making an initial estimate of the camera's scene, projected onto the floor plan, as a geo-polygon 501 using the camera specifications and the floor plan, (see computer vision book in the prior art for method). The method includes the robot to navigating the geo-polygon 502. The robot navigation can be controlled by the computing system or operate autonomously, for example, using geo-localization and the floor plan. The method includes detecting when the robot enters and leaves a scene of the camera 503 using the robot detection deep-learning model. At block 504 the method includes performing time synchronization between deep-learning inference data and geo-localization data sent by the robot. According to some embodiments, the system uses two data sources including coordinates (e.g., GPS coordinates) received from the robot and a video stream received from the camera, and these data sources are time synchronized to improve an accuracy of detection results and generated models, for example, so that an exact time an alert is generated can be compared to an appearance of the robot in an image (e.g., is the robot fully in the scene, entering and partially in the scene, exiting the scene and still partially visible, etc.). The method includes mapping at least one point in the camera's scene to the geo-coordinates of the robot, which can be translated into a position within the geo-polygons 505, which enables users to select a point on a video stream of the camera and send a robot to that location. At block 506 data about the scene of the camera are recorded, which enable the discovery of blind angles and reposition the cameras. Data about the detected robot landmarks are recorded 507 with the robot occupying various positions in the scene. Using a geometric method, such as a homography, the recorded data (i.e., detected and recorded robot landmarks) can be used to calibrate the camera. Alerts are configured at block 508. To configure alerts 508 that involve regions of interest/uninterest or virtual tripwires, a user draws a polygon or line on a digital representation/display of the floor plan, and the geometric shape is mapped to the geo-coordinates, which enables the robot to move along the edges of the geo-polygon, while the video analytics detects the robot and captures trajectories, where captured trajectories are used as the representation of the region of interest (ROI) on the video stream. The use of a human-shaped robot is helpful in this case. To configure alerts 508 (that can be executed/triggered by the computing system) that involve a minimum and/or maximum number of pixels, the robot crisscrosses a region of interest, the video analytics detects the robot and calculates its size in pixels, minimum and maximum sizes are calculated across the region of interest. If the robot dimensions are not equal (e.g., depth<width), the robot may crisscross the region of interest multiple times in different directions. Being able to modify the dimensions of the robot (e.g., using the adjustable framework) can be helpful in this case. If the dimensions of the robot are known, the dimensions can be extrapolated to a minimum and maximum dimension for other objects that need to navigate the environment (e.g., a person). In particular environments, these dimensions can be further constrained by the known dimensions of the objects that are expected to appear in the images captured by camera.

According to some embodiments, the computing system generates camera positioning suggestions. If a region of interest or a virtual tripwire is partly outside of the scene, an alert is generated and a camera positioning adjustment is recommended. The position of cameras, even static ones, can change. By periodically re-running the calibration steps (see FIG. 5), the computing system can detect if a camera has moved (e.g., by comparing a point in the camera's scene to geo-coordinates). Upon detecting a change (e.g., greater than a threshold, such a 2 degrees of arc), the computing system can issue an alert to a user.

Figure 7:
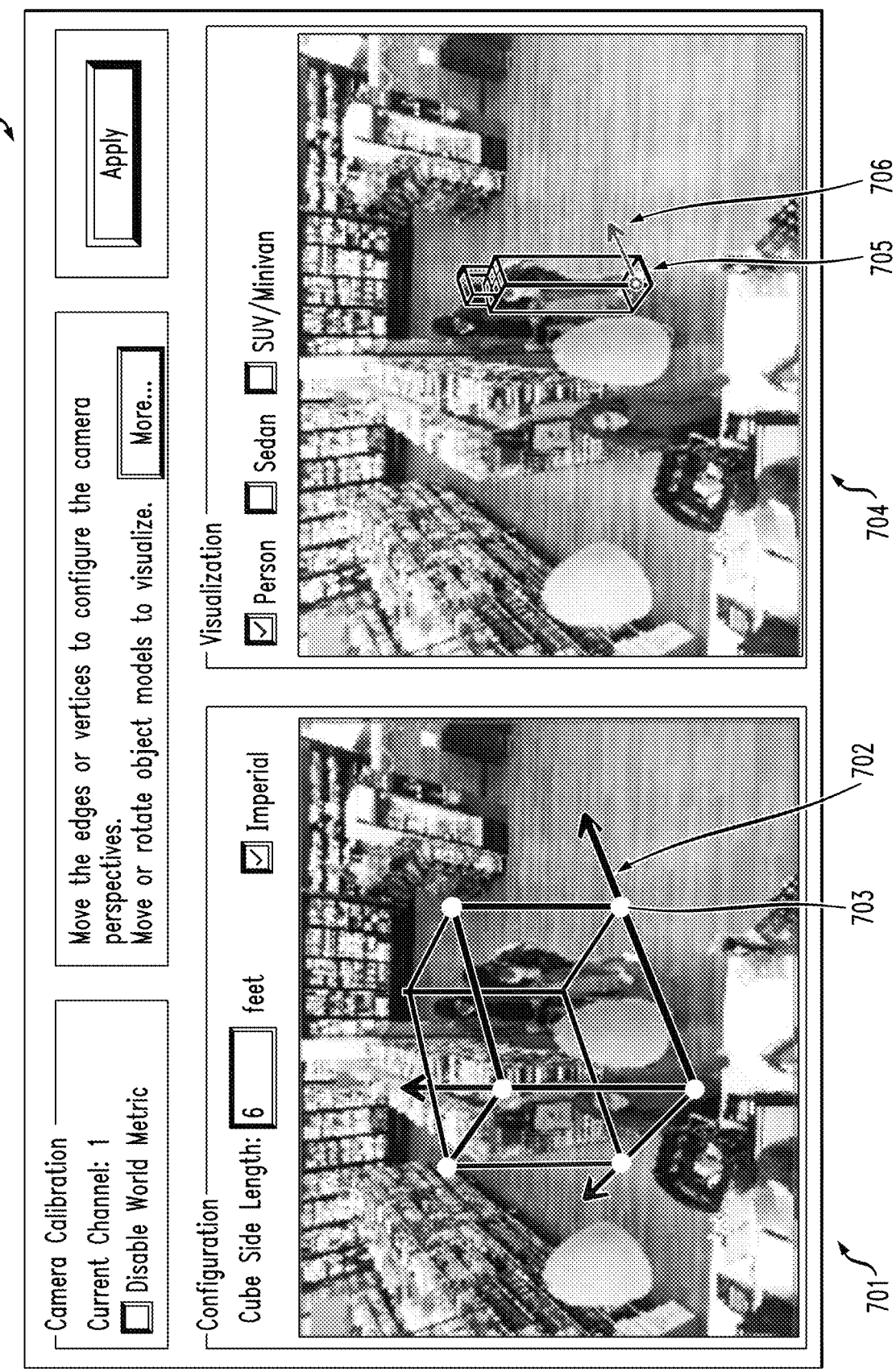
FIG. 7 shows a User Interface (UI) 700 enabling camera calibration according to some embodiments of the present invention.

FIG. 7 shows a User Interface (UI) 700 enabling camera calibration according to some embodiments of the present invention. The UI includes a configuration window 701 enabling a user to move the edges, e.g., 702, or vertices, e.g., 703, of a bounding box (e.g., by drag-and-drop) to configure camera perspectives. The UI includes a visualization window 704, in which detected objects (e.g., in an augmented view including box(es) 705 around the detected object) and their vectors (e.g., see vector 706).

Figure 6:
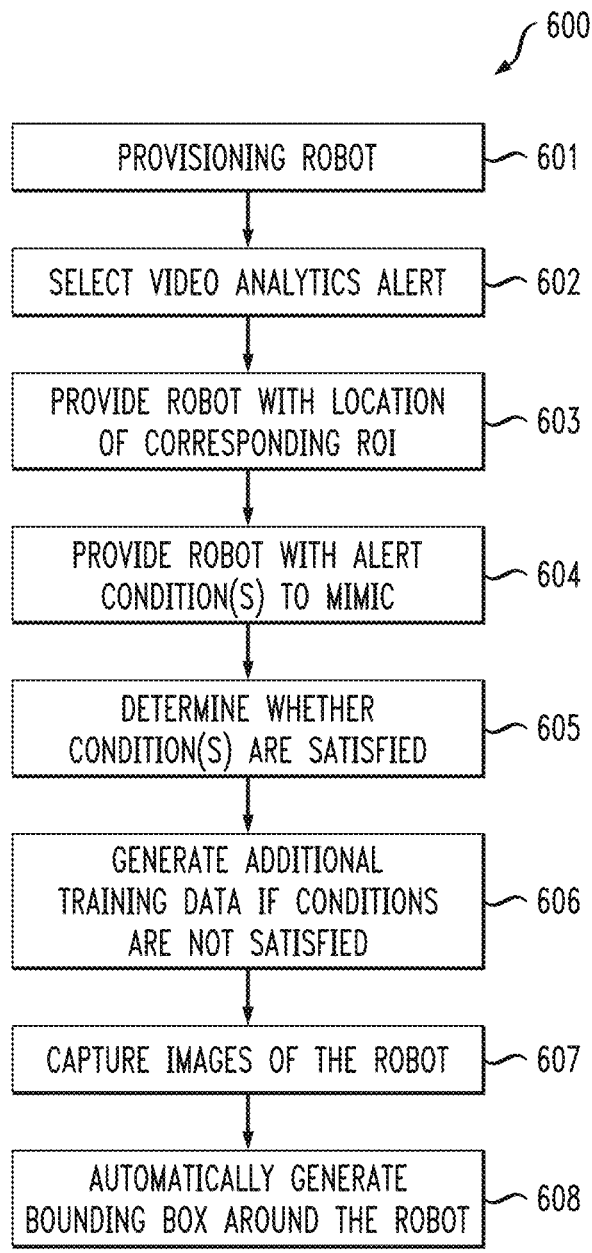
FIG. 6 is a flow diagram showing a method for automatically generating a bounding box according to some embodiments of the present invention.

According to some embodiments and referring to FIG. 6, an automatic testing method 600 includes providing a robot with a human-like shape 601 and using the robot in testing the computing system, including the video analytics. The human-like shape is detectable as a person by the deep-learning detection model used in the video analytics pipeline. For each video analytics alert definition 602, the robot is instructed to navigate to a corresponding region of interest 603 (a region that is monitored and in which certain activity will trigger the alert), and an exact context and location is determined where an alert condition(s) is/are satisfied (e.g., minimum or maximum size, direction, speed, etc.) by the robot 604, where the computing system can verify whether an alert is triggered 605. According to some embodiments, the robot is controlled to mimic the behavior of a human in the region of interest, the mimicked behavior being configured to trigger one or more alert conditions. For example, the robot can be controlled to pass through the region of interest at a speed that triggers an alert condition associated with a running human. In a case where the alert is not triggered by the robot, additional training data is generated with automatic annotation 606. By iterating through the video analytics alert definitions, the computing system can capture images of the robot 607 in various locations, various positions, and various dimensions, and use a homography to automatically generate a bounding box around the robot 608. For example, at 608, given the geocoordinates of the robot and its physical dimensions, and the homography defined while calibrating the cameras is applied to extract pixel coordinates of the robot in the images captured by the camera. These pixel coordinates, together with the camera images, constitute new training data.

According to some embodiments, at blocks 606-608 of FIG. 6, if an alert is not triggered when the robot reproduces the alert condition, the detection model has failed to detect the robot. Such a failure will indicate that additional training data is needed to re-train the model. The additional training data can include an image capture of the scene provided with a bounding box identifying the location of the region of interest within the environment in which the robot should have been detected by the model in the earlier iteration.

It should be understood that bounding boxes can be stored as a set of coordinates bounding a detected object. It can be useful, for performance reasons, to choose a bounding box that is as small as possible around the detected object.

Figure 8:
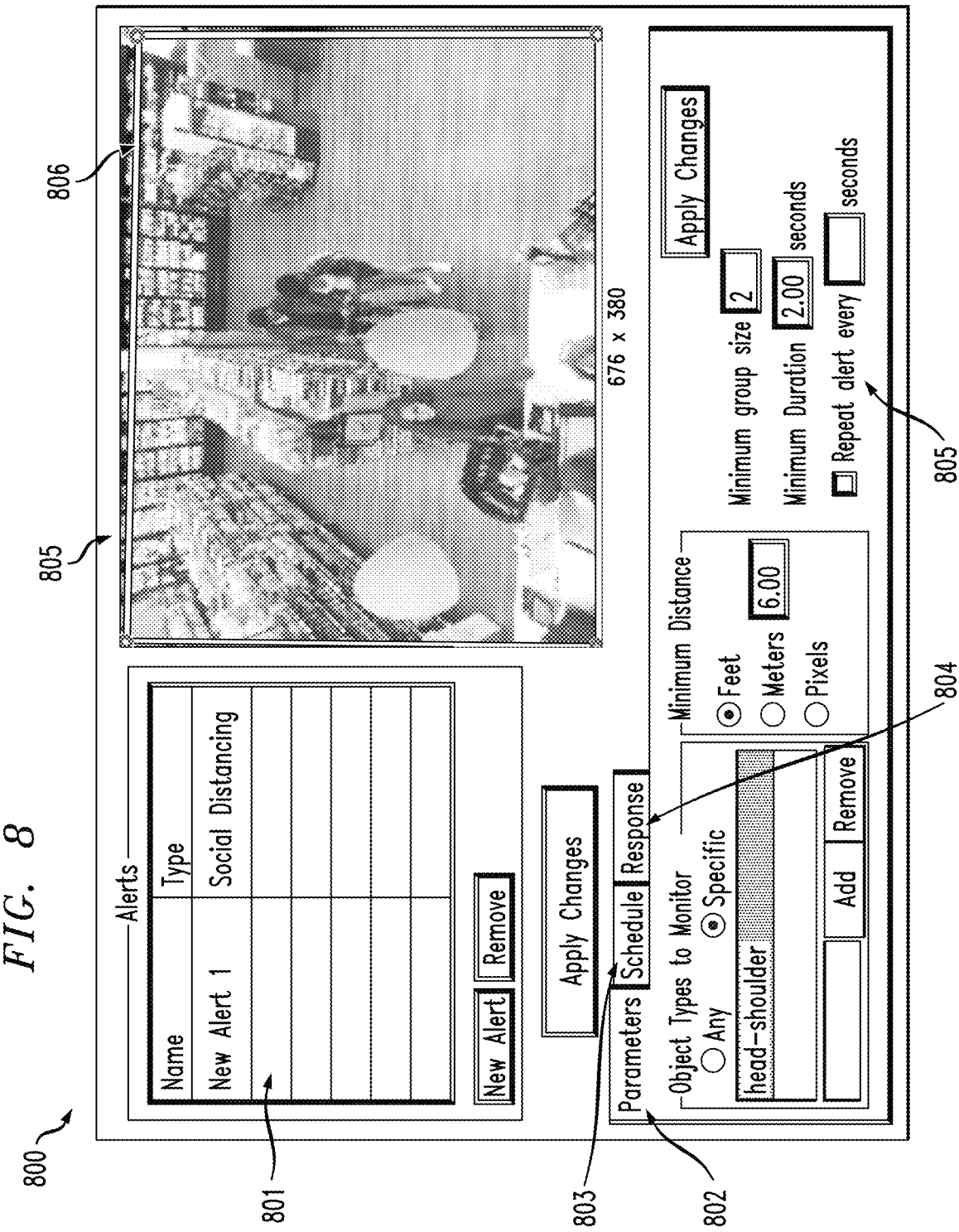
FIG. 8 shows a UI enabling alert configuration according to some embodiments of the present invention.

FIG. 8 shows a UI 800 enabling alert configuration according to some embodiments of the present invention. The UI includes a list of alerts 801, and a set of controls for creating and modifying each alert. The controls include, for example, parameters 802, schedule 803 (e.g., for setting a time that the alerts are active), responses 804 (e.g., for configuring text alerts, audio alerts, controlling IoT devices, for example, to control lighting, locking/unlocking doors, etc.). Each tab (e.g., 802-804) can reveal include controls to adjusting various features thereof. The UI includes a visualization window 805, in which a bounding box(es) 806, virtual tripwires, etc. can be set for the current alert selected in the list of alerts 801.

Figure 9:
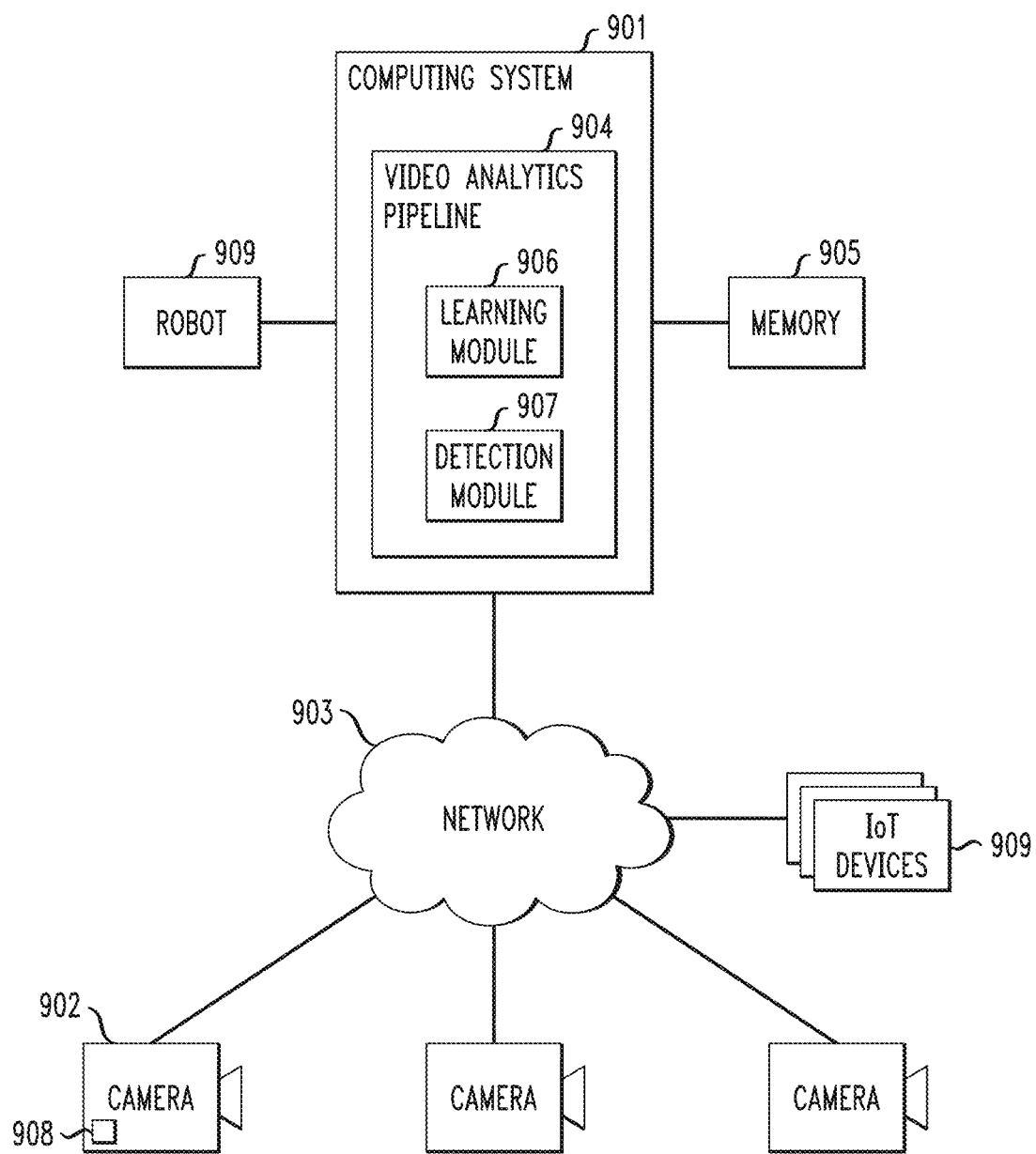
FIG. 9 is a diagram of a computer system that may be useful in implementing one or more aspects and/or elements of the invention.

FIG. 9 shows a computing system 901 including a plurality of connected cameras, e.g., 902, where the computing system and cameras are connected by a network 903, for example, including ethernet connections, wireless connections, coaxial cable, etc. The computing system 901 includes software modules 904, such as the video analytics pipeline, and storage facilities 905 (e.g., memory, local database, cloud storage, etc.). The video analytics pipeline includes to the learning model 906, the object detection model 907, etc., which are stored in memory 905 of the computing system 901. One or more cameras can include motion control servos 908 for adjusting the field of view. The network 903 further connects the computing system 901 to IoT devices 909, which are receive signals corresponding to alerts, etc. The computing system 901 is further connected to one or more robots, 909, for example, by Bluetooth or other wireless communications functionality.

According to some embodiments of the present invention, the detection method uses a background subtraction process. The background subtraction process includes a background initialization including providing an initial background image of the environment, classifying pixels in a subsequent image(s) captured by at least one of the cameras as foreground or background by comparing the background image and the subsequent image(s), and updating the background image by using the previous background, the subsequent image(s), and a foreground detection mask. This process is repeated a number of times, with the detection method improving each iteration, e.g., by deep-learning.

Recapitulation:

According to some embodiments of the present invention, a method of calibrating a system including a camera includes receiving data about an environment modeled as a geo-polygon space 301, making an initial estimate of a scene of the environment captured by the camera 501, detecting a robot navigating within the environment 503, including a transit of the robot through the scene, mapping a plurality of points occupied by the robot in the images of the scene to the geo-polygon space 505, recording data about the mapping 506, and configuring at least one alert using the data recorded about the mapping, the alert executed by the computing system and configured to be triggered by an object transiting the scene 508.

According to one or more embodiments, a system comprises a computing system 901 including a processor 16 and a memory 28, a network 903 connected to the computing system, a plurality of cameras, e.g., 902, connected to the computing system via the network, each camera with a field of view of an environment, at least one robot 909 with in the environment, and at least one software module 904 executing on the computing system, enabling the computing system to learn a model configured to identify the robot in the environment and the creation of at least one alert triggered by an object detection model executed by the computing system.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for organizing and servicing resources of the computer system. Further, a computer program product can include a tangible computer-readable recordable storage medium with code adapted to be executed to carry out one or more method steps described herein, including the provision of the system with the distinct software modules.

Figure 10:
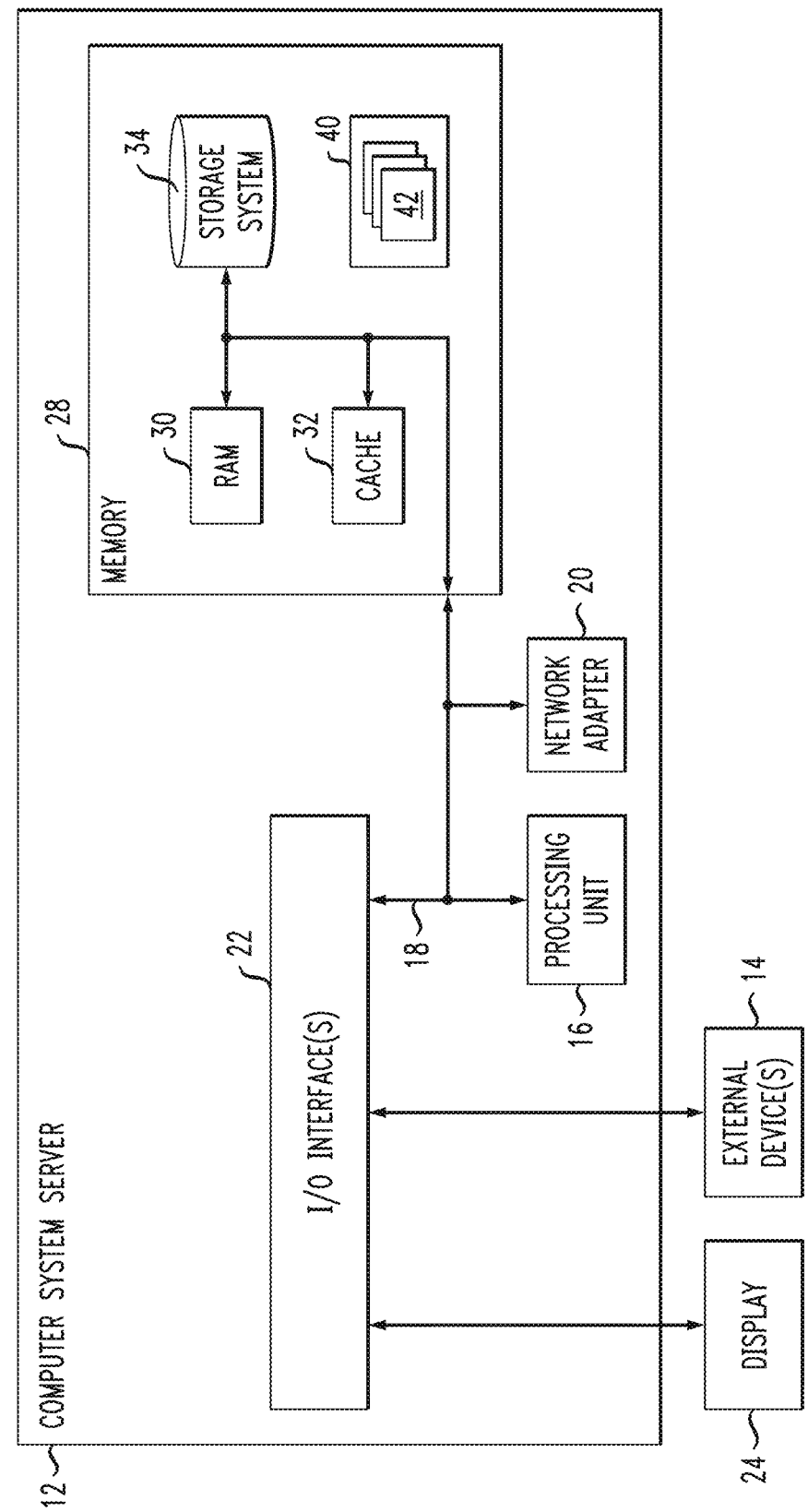
FIG. 10 depicts a computer system that may be useful in implementing one or more aspects and/or elements of the invention.

One or more embodiments of the invention, or elements thereof, can be implemented in the form of an apparatus including a memory and at least one processor that is coupled to the memory and operative to perform exemplary method steps. FIG. 10 depicts a computer system that may be useful in implementing one or more aspects and/or elements of the invention, also representative of a cloud computing node according to an embodiment of the present invention. Referring now to FIG. 10, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 10, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 10) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a database app in layer 66.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of calibrating a system including a camera, the method comprising:
   detecting a robot navigating within an environment modeled as a geo-polygon space, including a transit of the robot through a scene of the environment captured by the camera;
   mapping a plurality of points occupied by the robot in images of the scene to the geo-polygon space;
   recording data about the mapping;
   configuring at least one alert using the data recorded about the mapping, the alert executed by the computing system and configured to be triggered by an object transiting the scene;
   providing the robot with a location of a region of interest within the environment;
   providing the robot with an alert condition;
   mimicking, by the robot, the alert condition during the transit of the robot through the scene; and
   determining that the alert condition is satisfied by the robot.

2. The method of claim 1, further comprising:
   repeating the providing the robot with a second location of a second region of interest within the environment;
   repeating the providing the robot with a second alert condition;
   repeating the mimicking, by the robot, the second alert condition during the transit of the robot through the scene;
   determining that the second alert condition is not satisfied by the robot; and
   recording additional data about the robot in the scene until the condition can be satisfied.

3. The method of claim 2, further comprising providing training data to the system including an image of the scene comprising a bounding box identifying the location of the region of interest within the environment.

4. The method of claim 1, further comprising synchronizing timing data of geo-localized data received from the robot and timing data of the computing system.

5. The method of claim 1, further comprising receiving data about the robot including at least one dimension of the robot.

6. A non-transitory computer readable storage medium comprising computer executable instructions which when executed by a computer cause the computer to perform a method for calibrating a system including a camera, the method comprising:
   detecting a robot navigating within an environment modeled as a geo-polygon space, including a transit of the robot through a scene of the environment captured by the camera;
   mapping a plurality of points occupied by the robot in the images of the scene to the geo-polygon space;
   recording data about the mapping;
   configuring at least one alert using the data recorded about the mapping, the alert executed by the computer and configured to be triggered by an object transiting the scene;
   providing the robot with a location of a region of interest within the environment;
   providing the robot with an alert condition;
   mimicking, by the robot, the alert condition during the transit of the robot through the scene; and
   determining that the alert condition is satisfied by the robot.

7. The computer readable storage medium of claim 6, further comprising:
   repeating the providing the robot with a second location of a second region of interest within the environment;

repeating the providing the robot with a second alert condition;

repeating the mimicking, by the robot, the second alert condition during the transit of the robot through the scene;

determining that the second alert condition is not satisfied by the robot; and recording additional data about the robot in the scene until the condition can be satisfied.

8. The computer readable storage medium of claim 7, further comprising providing training data to the system including an image of the scene comprising a bounding box identifying the location of the region of interest within the environment.

9. The computer readable storage medium of claim 6, further comprising synchronizing timing data of geo-localized data received from the robot and timing data of the computing system.

10. The computer readable storage medium of claim 6, further comprising receiving data about the robot including at least one dimension of the robot.

11. A system comprising:

a computing system including a processor and a memory;

a network connected to the computing system;

a plurality of cameras connected to the computing system via the network, each camera with a field of view of an environment;

at least one robot with in the environment;

at least one software module executing on the computing system, enabling the computing system to learn a model configured to identify the robot in the environment and the creation of at least one alert triggered by an object detection model executed by the computing system;

providing the robot with a location of a region of interest within the environment;

providing the robot with an alert condition;

mimicking, by the robot, the alert condition during the transit of the robot through the scene; and determining that the alert condition is satisfied by the robot.

12. The system of claim 11, wherein the at least one robot includes at least one configuration graphic.

13. The system of claim 12, wherein the at least one configuration graphic is a geometric shape of known dimensions.

14. The system of claim 11, wherein the robot comprises at least one display configured to display a detectable token visible to the plurality of cameras.

\* \* \* \* \*